(12) United States Patent
Jeong

(10) Patent No.: US 12,181,728 B2
(45) Date of Patent: *Dec. 31, 2024

(54) LENS ASSEMBLY, CAMERA MODULE, AND OPTICAL DEVICE

(71) Applicant: LG Innotek Co., Ltd., Seoul (KR)

(72) Inventor: Youn Baek Jeong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/350,398

(22) Filed: Jul. 11, 2023

(65) Prior Publication Data

US 2023/0358996 A1   Nov. 9, 2023

Related U.S. Application Data

(63) Continuation of application No. 17/149,147, filed on Jan. 14, 2021, now Pat. No. 11,740,429, which is a (Continued)

(30) Foreign Application Priority Data

Jan. 6, 2016  (KR) ........................ 10-2016-0001493

(51) Int. Cl.
  *G02B 7/09*   (2021.01)
  *G02B 7/08*   (2021.01)
  (Continued)

(52) U.S. Cl.
  CPC ................ *G02B 7/09* (2013.01); *G02B 7/08* (2013.01); *G02B 27/646* (2013.01);
  (Continued)

(58) Field of Classification Search
  CPC . G02B 7/09; G03B 5/00; G03B 13/36; G03B 3/10; G03B 17/12; G03B 30/00;
  (Continued)

(56) References Cited

U.S. PATENT DOCUMENTS 9,185,280 B2   11/2015 Kim
10,921,545 B2 *  2/2021 Jeong ...................... G02B 7/08
(Continued)

FOREIGN PATENT DOCUMENTS

KR      10-0843473 B1    7/2008
KR   10-2011-0108183 A   10/2011
(Continued)

OTHER PUBLICATIONS

Machine translation of KR20120086912 (Year: 2012).*
(Continued)

*Primary Examiner* — Alicia M Harrington
(74) *Attorney, Agent, or Firm* — Saliwanchik, Lloyd & Eisenschenk

(57) ABSTRACT

A lens assembly can include: a holder; a lens module disposed at an inner side of the holder; an optical module disposed at an upper side of the lens module; and an conductive substrate electrically connected to the optical module. The conductive substrate includes: a body part disposed at an upper side of the holder; and an extension part extended from one end of the body part, and including a terminal part, the holder includes a second lateral surface formed by being recessed inwards from a portion of a first lateral surface, and at least a portion of the extension part is disposed at the second lateral surface.

20 Claims, 6 Drawing Sheets

Related U.S. Application Data continuation of application No. 16/068,286, filed as application No. PCT/KR2017/000185 on Jan. 6, 2017, now Pat. No. 10,921,545.

(51) Int. Cl.
  *G02B 27/64* (2006.01)
  *G03B 5/00* (2021.01)
  *G03B 13/36* (2021.01)
  *G03B 17/02* (2021.01)

(52) U.S. Cl.
  CPC ............ *G02B 27/648* (2013.01); *G03B 5/00* (2013.01); *G03B 13/36* (2013.01); *G03B 17/02* (2013.01); *G03B 2205/0007* (2013.01); *G03B 2217/007* (2013.01)

(58) Field of Classification Search
  CPC . G03B 2205/0069; H04N 23/55; H04N 23/57
  See application file for complete search history.

(56) References Cited

U.S. PATENT DOCUMENTS

| | | | |
|---|---|---|---|
| 11,740,429 B2 * | 8/2023 | Jeong | ................ G02B 7/09 359/819 |
| 2011/0134303 A1 | 6/2011 | Jung et al. | |
| 2014/0092296 A1 | 4/2014 | Han | |
| 2015/0253534 A1 | 9/2015 | Kang et al. | |
| 2015/0296106 A1 | 10/2015 | Oh | |
| 2016/0173744 A1 | 6/2016 | Kim | |

FOREIGN PATENT DOCUMENTS

| | | | | |
|---|---|---|---|---|
| KR | 10-2012-0027751 A | | 3/2012 | |
| KR | 10-1173111 B1 | | 8/2012 | |
| KR | 20120086912 A | * | 8/2012 | ............ H04N 23/55 |
| KR | 10-2013-0136766 A | | 12/2013 | |
| KR | 10-2014-0007182 A | | 1/2014 | |
| KR | 10-2014-0077301 A | | 6/2014 | |
| KR | 10-2015-0007672 A | | 1/2015 | |
| WO | WO-2011145907 A2 | * | 11/2011 | ........... B81B 7/0006 |
| WO | WO-2013168892 A1 | * | 11/2013 | ............... G03B 5/00 |

OTHER PUBLICATIONS

International Search Report in International Application No. PCT/KR2017/000185, filed Jan. 6, 2017.
Office Action dated Oct. 17, 2019 in U.S. Appl. No. 16/068,286.
Office Action dated Apr. 29, 2020 in U.S. Appl. No. 16/068,286.
Notice of Allowance dated Oct. 15, 2020 in U.S. Appl. No. 16/068,286.
Office Action dated Nov. 10, 2022 in Korean Application No. 10-2016-0001493.
Office Action dated Mar. 26, 2024 in Korean Application No. 10-2023-0107796.

* cited by examiner

LENS ASSEMBLY, CAMERA MODULE, AND OPTICAL DEVICE

CROSS-REFERENCE TO RELATED APPLICATIONS

This application is a continuation of U.S. application Ser. No. 17/149,147, filed Jan. 14, 2021, now U.S. Pat. No. 11,740,429, issued Aug. 29, 2023; which is a continuation of U.S. application Ser. No. 16/068,286, filed Jul. 5, 2018, now U.S. Pat. No. 10,921,545, issued Feb. 16, 2021; which is the U.S. national stage application of International Patent Application No. PCT/KR2017/000185, filed Jan. 6, 2017, which claims priority to Korean Application No. 10-2016-0001493, filed Jan. 6, 2016, the disclosures of each of which are incorporated herein by reference in their entirety.

TECHNICAL FIELD

This embodiment relates to a lens assembly, a camera module, and an optical device.

BACKGROUND ART

This section provides background information related to the present disclosure, which is not necessarily prior art.

Concomitant with widely generalized dissemination of various mobile terminals and commercialization of wireless Internet services, demands by consumers related to mobile terminals are diversified to prompt various types of circumferential devices or additional equipment to be mounted on mobile terminals.

Inter alia, camera modules may be representative items photographing an object in a still picture or a video. Recently, camera modules performing an auto focus function through a lens actuator have been manufactured. Meantime, the camera modules are disposed with a contact pin in order to electrically conduct the conventional lens actuator thus mentioned.

On the other hand, the camera modules having the contact pin suffer from workability when the contact pin is electrically connected and auto focus numbness (no auto focus) is generated due to contact inferiority (poor contact). Furthermore, there is a fear of destruction of camera module due to availability of contact pin when a camera module undergoes a shock test.

DETAILED DESCRIPTION OF THE INVENTION

Technical Subject

In order to solve the abovementioned problems/disadvantages, exemplary embodiments of the present invention provide a lens assembly performing an electric conductivity of optical module through an FPCB (Flexible Printed Circuit Board).

Furthermore, exemplary embodiments of the present invention provide a camera module performing an electric conductivity of optical module through an active alignment by changing an optical adjustment between a lens assembly and a base assembly to a full assembly type.

Moreover, exemplary embodiments of the present invention provide an optical device including the camera module.

Technical Solution

In one general aspect of the present invention, there is provided a lens assembly comprising: a holder; a lens module disposed at an inner side of the holder; an optical module disposed at an upper side of the lens module; and an conductive substrate electrically connected to the optical module, wherein the conductive substrate includes: a body part disposed at an upper side of the holder; and an extension part extended from one end of the body part, and including a terminal part, and the holder includes a second lateral surface formed by being recessed inwards from a portion of a first lateral surface, and at least a portion of the extension part is disposed at the second lateral surface.

The second lateral surface may be extended from an upper end of the holder to a lower end of the holder in a shape corresponding to the extension part.

The terminal part may be formed at a lower end of the extension part, and a lower end of the terminal part may be disposed at more lower side than the lower end of the holder.

The lens assembly further comprises: a cover member disposed at an upper side of the holder, wherein the body part of the conductive substrate may be interposed between an upper side of the holder and a lower side of the cover member, and wherein the cover member may include a first reception groove in which a portion of the lower side is formed by being recessed in a corresponding shape to the portion of the body part of the conductive substrate and the extension part, and portions of the body part and the extension part are accommodated.

The optical module may be interposed between the body part of the conductive substrate and the cover member, wherein the cover member may include a second reception groove in which a portion of the lower side is formed by being recessed in a corresponding shape to the optical module to accommodate the optical module, and the second reception groove forms a staircase with the first reception groove by being more recessed than the first reception groove from the lower of the cover member.

The lens assembly may further comprise a shield member accommodating at an inside at least a portion of the holder, and the holder may further include a positioning end outwardly protruded from a first lateral surface to be formed at a lower end of the holder and a lower end of the shield member is disposed at the positioning end.

An outer lateral surface of the extension part may be disposed at a farther inside than an outer lateral surface of the positioning end.

The outer lateral surface of the extension part may surface-contact an inner surface of a lateral plate of the shield member.

The terminal part may include a first terminal and a second terminal, each spaced apart from the other terminal, and the first and second terminals may be disposed at a lower side of the shield member to be exposed to an outside.

Thickness of extension part may correspond to a depth of the second lateral surface recessed from the first lateral surface.

The outer lateral surface of the extension part and the first lateral surface of holder may be disposed on one same planar surface.

The second lateral surface may be extended from an upper end of the holder to a lower end of the holder.

The conductive substrate may include a through hole passing through an inside of the body part to an optical axis direction, and an electric current carrying part protruded inwardly from an inner circumferential surface forming the through hole and electrically connected to the optical module.

The lens module may be fixed to an inside of the holder, and the optical module may perform any one or more of the auto focusing function and OIS function in response to an applied power.

In another general aspect of the present invention, there is provided a camera module, comprising: a base assembly; and a lens assembly coupled to the base assembly, wherein the lens assembly includes: a holder; a lens module disposed at an inner side of the holder; an optical module disposed at an upper side of the lens module; and an conductive substrate electrically connected to the optical module, wherein the conductive substrate includes: a body part disposed at an upper side of the holder; and an extension part extended from one end of the body part, and including a terminal part, and the holder includes a second lateral surface formed by being recessed inwards from a portion of a first lateral surface, and at least a portion of the extension part is disposed at the second lateral surface.

The base assembly may include: a circuit substrate; an image sensor mounted on the circuit substrate; a sensor base disposed on an upper surface of the circuit substrate to accommodate the image sensor; and a filter disposed at a through hole of the sensor base.

The holder may include a first coupling surface coupled to the sensor base, and the sensor base may include a second coupling surface facing the first coupling surface of the holder, an area of the second coupling surface may be larger than that of the first coupling surface, and the first coupling surface and the second coupling surface may be adhered by an adhesive member cured by more than any one of heat and UV (Ultraviolet) rays.

The sensor base may include a reception groove formed by being recessed inwardly from an outer circumferential surface, and at least a portion of terminal part may be accommodated into the reception groove, and the terminal part may be electrically connected to the circuit substrate through an electric current carrying member.

The reception groove may be extended from a lower surface of the holder, and one surface may accommodate at least a portion of extension lug formed on the second lateral surface.

In still another general aspect of the present invention, there is provided an optical device, comprising: a body part; a camera module disposed at the body part to photograph an image of a subject; and a display part disposed at the body part to output the image photographed by the camera module, wherein the camera module includes: a base assembly; and a lens assembly coupled to the base assembly, wherein the lens assembly includes: a holder; a lens module disposed at an inner side of the holder; an optical module disposed at an upper side of the lens module; and an conductive substrate electrically connected to the optical module, wherein the conductive substrate includes: a body part disposed at an upper side of the holder; and an extension part extended from one end of the body part, and including a terminal part, and the holder includes a second lateral surface formed by being recessed inwards from a portion of a first lateral surface, and at least a portion of the extension part is disposed at the second lateral surface.

A lens assembly according to an exemplary embodiment of the present invention may comprise: a holder; a lens module disposed at an inner side of the holder; an optical module disposed at an upper side of the lens module; and an conductive substrate electrically connected to the optical module, wherein the conductive substrate includes: a body part disposed at an upper side of the holder; and an extension part extended from one end of the body part, and including a terminal part, and the holder includes a second lateral surface formed by being recessed inwards from a portion of a first lateral surface, and at least a portion of the extension part is disposed at the second lateral surface.

The extension part may be extended along the second lateral surface.

The lens assembly according to an exemplary embodiment of the present invention may further comprise: a cover member including a receptor part accommodated by the optical module and disposed at an upper side of the holder; and a shield member accommodating, at an inside, at least a portion of the cover member and the holder, wherein the holder may further include a positioning end outwardly protruded from the first lateral surface to be disposed at a lower end of the holder, and a lower end of the shield member may be coupled to the positioning end.

The terminal part may include a first terminal and a second terminal, each spaced apart from the other, and the first and second terminals may be disposed at a lower side of the shield member to be exposed to an outside.

The lower end of the terminal part may be disposed at a lower side lower than the lower end of the holder.

The conductive substrate may include a through hole passing through an inside of the body part to an optical axis direction, and an electric current carrying part protruded from an inner circumferential surface forming the through hole to an inside to be electrically connected to the optical module.

The lens module may be fixed to an inside of the holder, and the optical module may perform any one or more of an auto focusing function and an OIS function in response to a power being applied.

A camera module according to an exemplary embodiment of the present invention may comprise: a base assembly; and a lens assembly coupled to the base assembly, wherein the lens assembly includes: a holder; a lens module disposed at an inner side of the holder; an optical module disposed at an upper side of the lens module; and an conductive substrate electrically connected to the optical module, wherein the conductive substrate includes: a body part disposed at an upper side of the holder; and an extension part extended and bent from one end of the body part, and the holder includes a second lateral surface formed by being recessed inwardly from a portion of a first lateral surface, and the extension part includes a terminal part, and the terminal part is disposed at the second lateral surface.

The base assembly may include: a circuit substrate; an image sensor mounted on the circuit substrate; a sensor base disposed on an upper surface of the circuit substrate to accommodate the image sensor; and a filter disposed at a through hole of the sensor base.

The holder may include a first coupling surface coupled to the sensor base, and the sensor base may include a second coupling surface facing the first coupling surface of the holder, an area of the second coupling surface may be larger than that of the first coupling surface, and the first coupling surface and the second coupling surface may be adhered by an adhesive member cured by more than any one of heat and UV (Ultraviolet) rays.

The sensor base may include a reception groove formed by being recessed inwardly from an outer circumferential surface, and at least a portion of terminal part may be accommodated into the reception groove, and the terminal part may be electrically connected to the circuit substrate through an electric current carrying member.

An optical device according to an exemplary embodiment of the present invention may comprise: a base assembly; and a lens assembly coupled to the base assembly, wherein the lens assembly may further include a holder; a lens module disposed at an inner side of the holder; an optical module disposed at an upper side of the lens module; and an conductive substrate electrically connected to the optical module, wherein the conductive substrate includes: a body part disposed at an upper side of the holder; and an extension part extended from one end of the body part, and including a terminal part, and the holder includes a second lateral surface formed by being recessed inwards from a portion of a first lateral surface, and at least a portion of the extension part is disposed at the second lateral surface.

Advantageous Effects

An FPCB and an optical module can be bonded through SMT (Surface Mounter Technology) through the present exemplary embodiment to allow easy assembly between the FPCB and the optical module and to reduce the work hours.

The lens assembly is manufactured in an FPCB terminal type to allow simplicity during soldering process.

An optimal lens performance can be realized through an active alignment process.

BEST MODE

Figure 1:
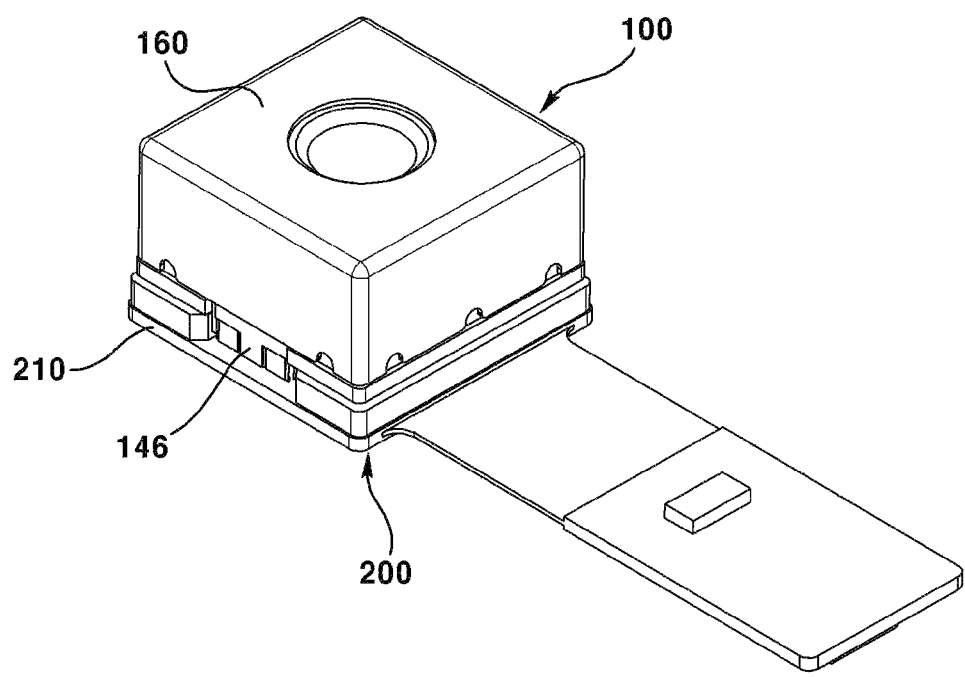
FIG. 1 is a perspective view illustrating a camera module according to an exemplary embodiment of the present invention.

Some of the exemplary embodiments of the present invention will be described with the accompanying drawings. Throughout the descriptions, the same reference numerals will be assigned to the same elements in the explanations of the figures. Accordingly, in some embodiments, well-known processes, well-known device structures and well-known techniques are not illustrated in detail to avoid unclear interpretation of the present disclosure.

Furthermore, the terms "first," "second," "A", "B", (a), (b) and the like, herein do not denote any order, quantity, or importance, but rather are used to distinguish one element from another. In the following description and/or claims, the terms coupled and/or connected, along with their derivatives, may be used. In particular embodiments, connected may be used to indicate that two or more elements are in direct physical and/or electrical contact with each other. "Coupled" may mean that two or more elements are in direct physical and/or electrical contact. However, coupled may also mean that two or more elements may not be in direct contact with each other, but yet may still cooperate and/or interact with each other. For example, "coupled", "joined" and "connected" may mean that two or more elements do not contact each other but are indirectly joined together via another element or intermediate elements.

An "optical axis direction" as used hereinafter may be defined as an optical axis direction of a lens module in a state of being coupled to a lens driving device. Meantime, the "optical axis direction" may be interchangeably used with "vertical direction" and "z axis direction" and the like.

An "auto focus function" as used hereinafter may be defined as a function of automatically matching a focus relative to an object by adjusting a distance from an image sensor by moving a lens module to an optical axis direction. Meantime, the "auto focus" may be interchangeably used with "AF".

A "handshake correction function" as used hereinafter may be defined as a function of moving or tilting a lens module to a direction perpendicular to an optical axis direction in order to offset vibration (movement) generated on the image sensor by an outer force. Meantime, the "handshake correction" may be interchangeably used with an "OIS (Optical Image Stabilization)".

Now, a configuration of an optical device according to an exemplary embodiment of the present invention will be described hereinafter.

The optical device may be a hand phone, a mobile phone, a smart phone, a portable smart device, a digital camera, a notebook computer (laptop computer), a PMP (Portable Multimedia Player) and a navigation device. However, the present invention is not limited thereto, and may include any device capable of photographing an image or a photograph.

The optical device may include a main body (not shown), a camera module and a display part (not shown). However, any one or more of the main body, the camera module and the display part may be omitted or changed.

The main body may form an exterior look of an optical device. For example, the main body may include a look of a cubic shape. For another example, the main body may be formed in a round shape on at least some portions thereof. The main body may accommodate a camera module. The main body may be arranged at one surface with a display part. For example, the display part and the camera module may be disposed at one surface of the main body and a camera module may be additionally disposed at the other surface (surface opposite to the one surface) of main body.

The camera module may be disposed at the main body. The camera module may be disposed at one surface of the main body. At least some portions of the camera module may be accommodated into the main body. The camera module may be formed in a plural number. The plurality of camera modules may be respectively disposed at one surface of the main body and the other surface of the main body. The camera module may photograph an image of a subject.

The display portion may be disposed at the main body. The display portion may be disposed at one surface of main body. That is, the display portion may be arranged on a same surface as that of the camera module. Alternatively, the display portion may be disposed at the other surface of main body. The display portion may be disposed at a surface on the main body opposite to a surface arranged with the camera module. The display portion may output an image photographed by the camera module.

Now, configuration of camera module according to an exemplary embodiment of the present invention will be described.

Figure 2:
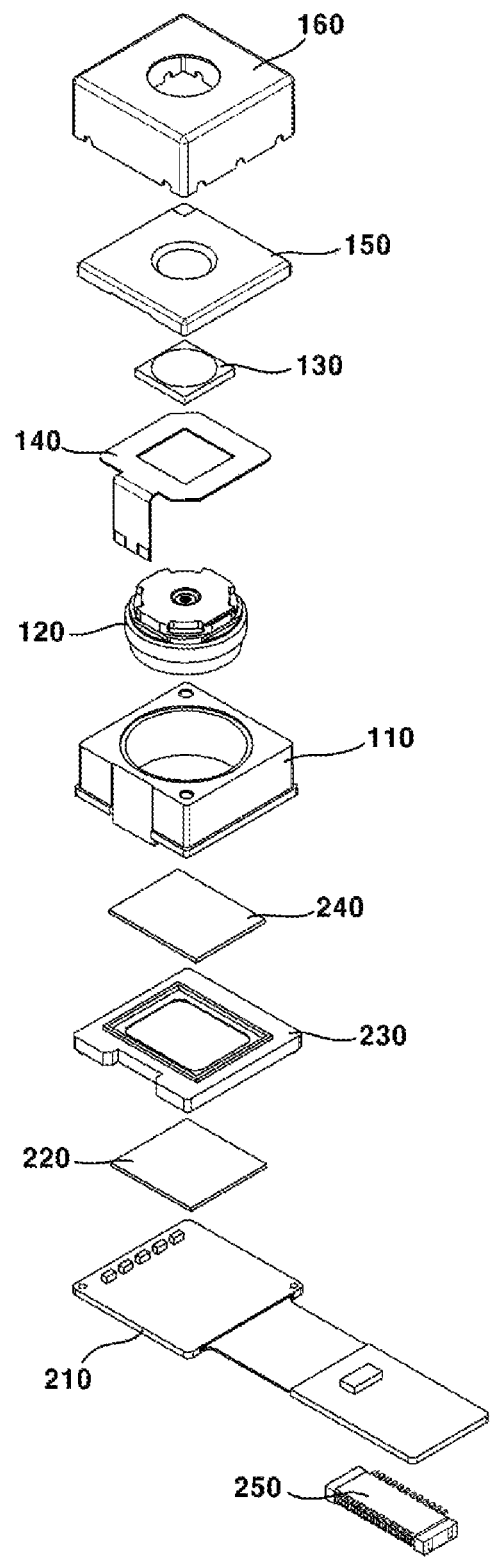
FIGS. 2 and 3 are exploded perspective view illustrating a camera module according to an exemplary embodiment of the present invention.
Figure 3:
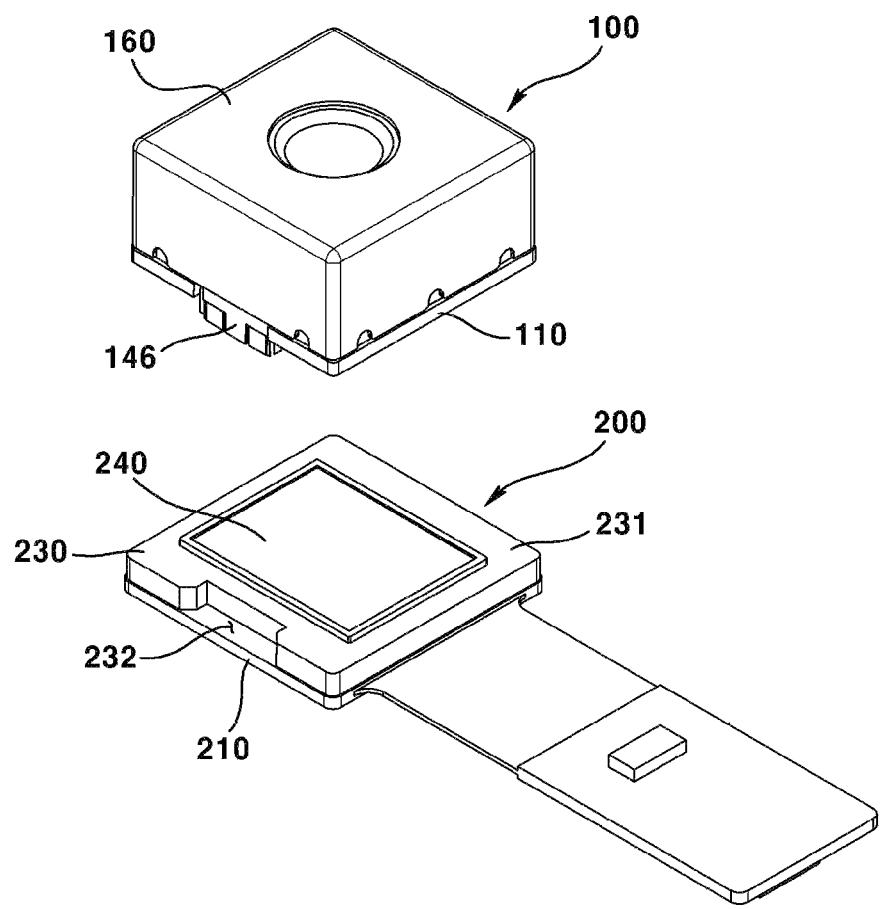
Figure 4:
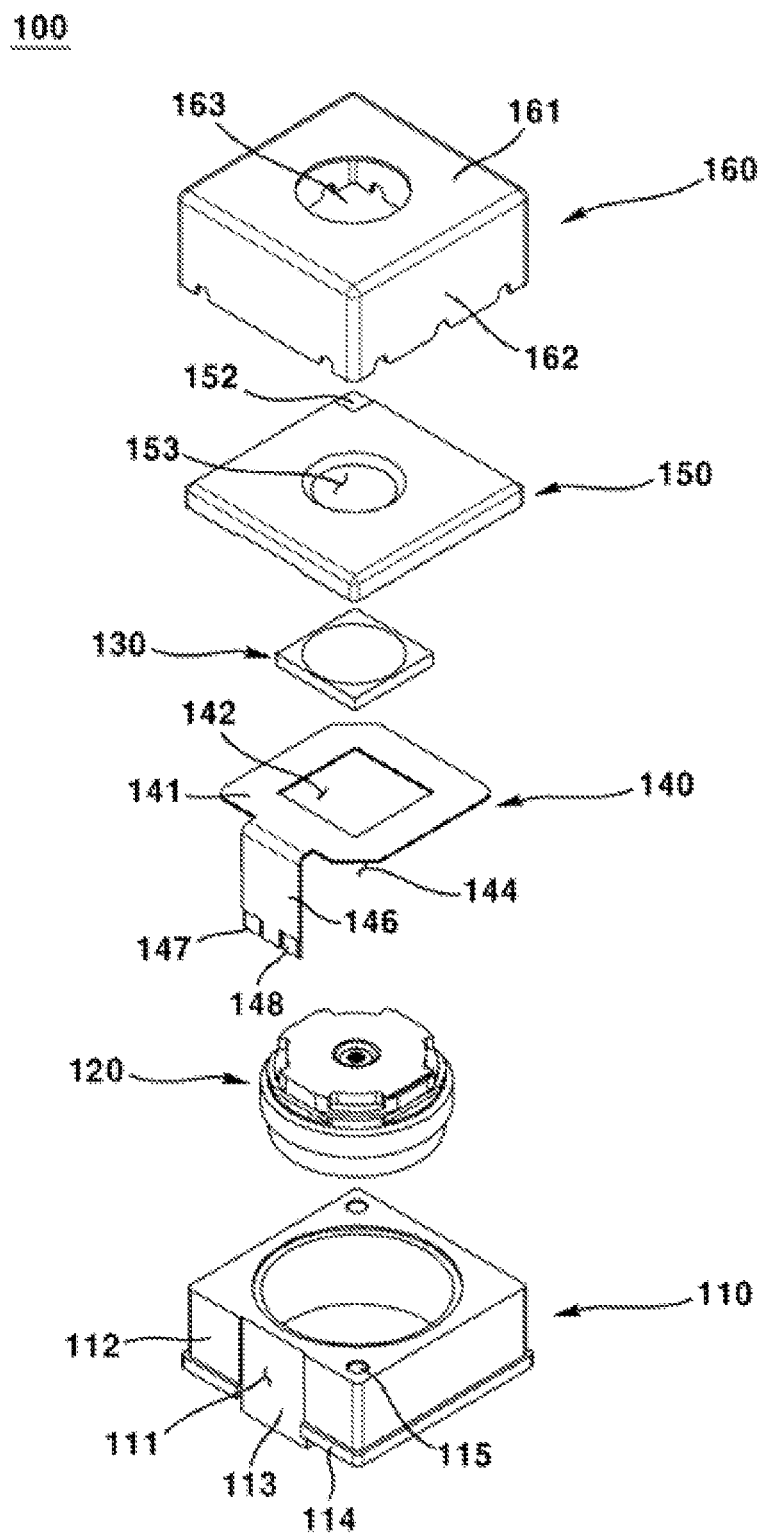
FIG. 4 is an exploded perspective view illustrating a lens assembly according to an exemplary embodiment of the present invention.
Figure 5:
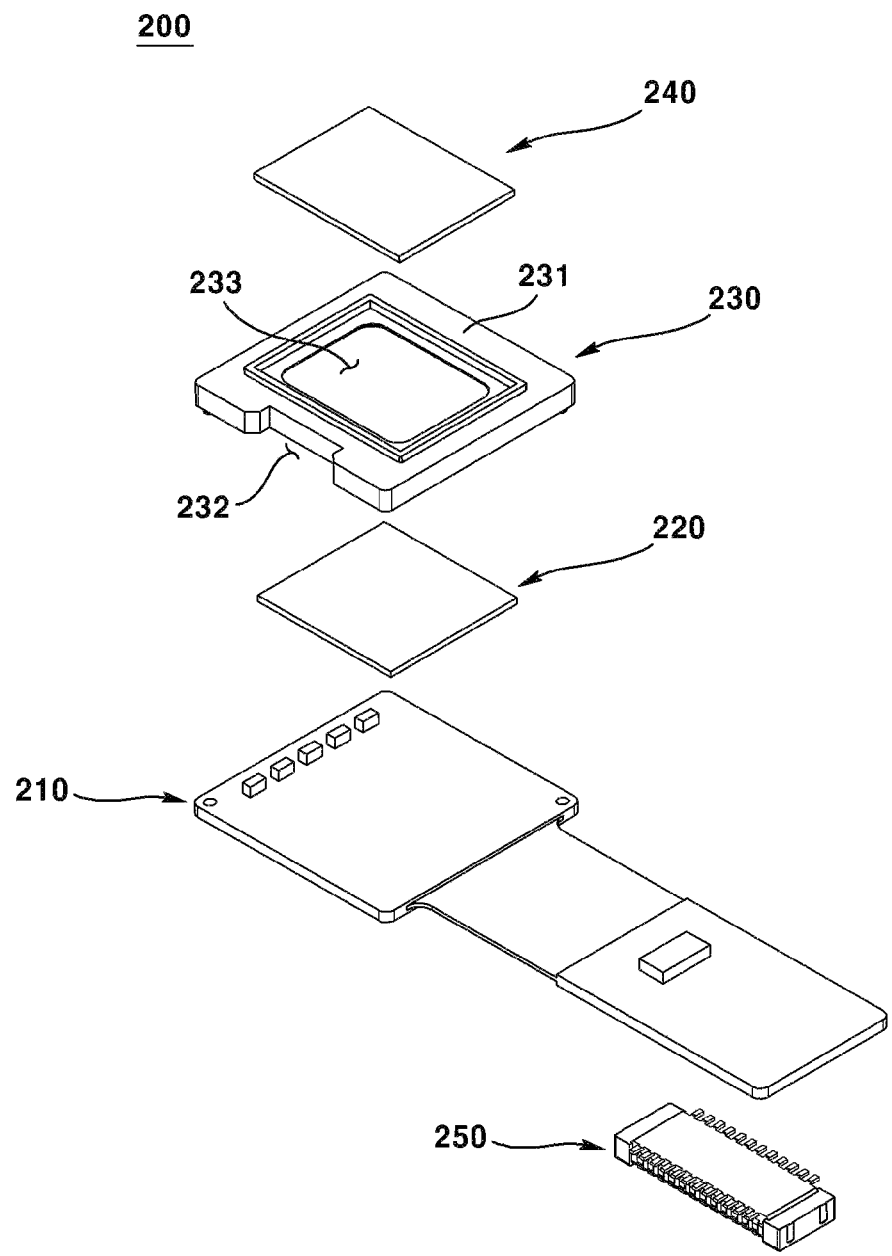
FIG. 5 is an exploded perspective view illustrating a base assembly according to an exemplary embodiment of the present invention.
Figure 6:
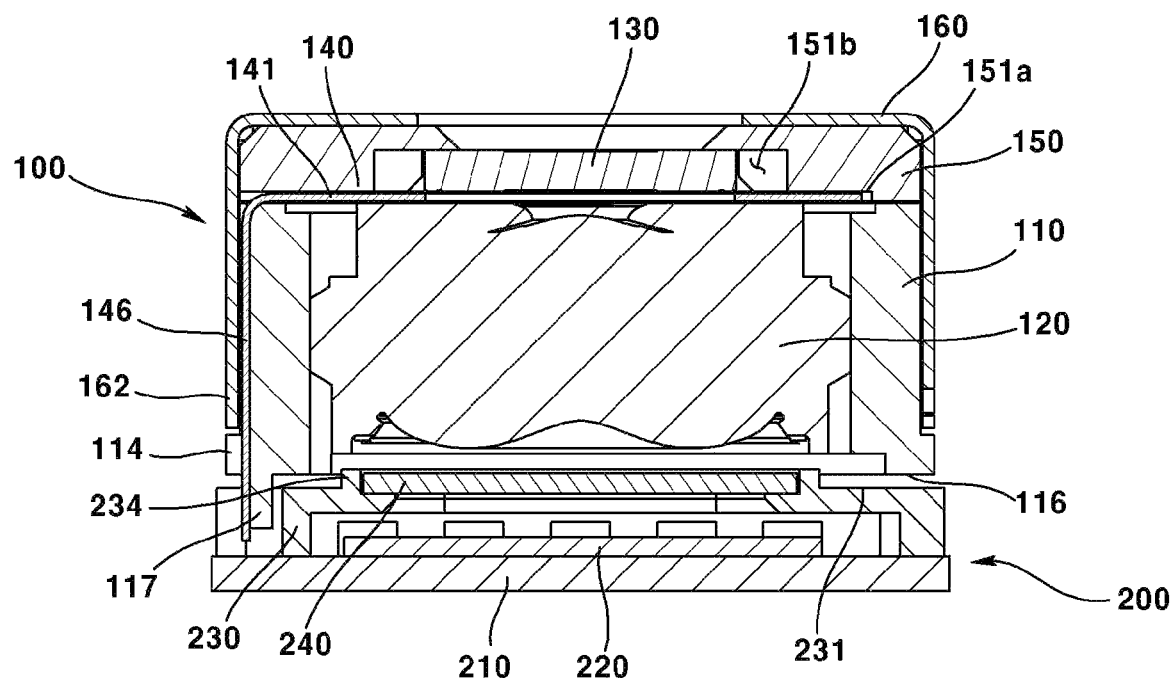
FIG. 6 is a cross-sectional view illustrating a camera module according to an exemplary embodiment of the present invention.
Figure 7:
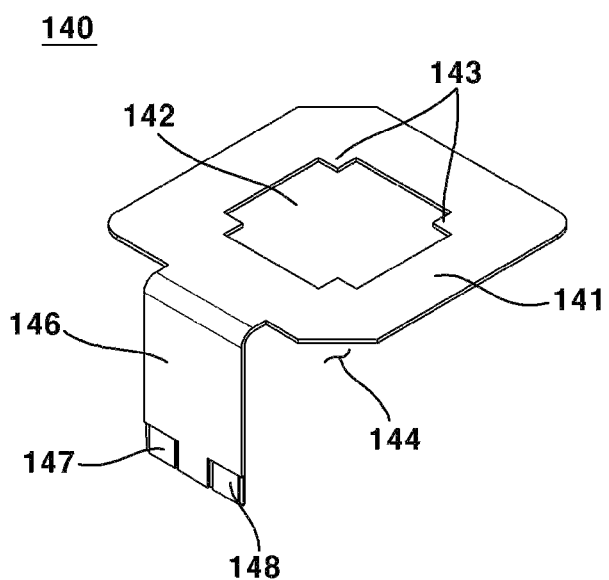
FIG. 7 is a perspective view illustrating an conductive substrate of a camera module according to a modification of the present invention.

FIG. 1 is a perspective view illustrating a camera module according to an exemplary embodiment of the present invention, FIGS. 2 and 3 are exploded perspective view illustrating a camera module according to an exemplary embodiment of the present invention, FIG. 4 is an exploded perspective view illustrating a lens assembly according to an exemplary embodiment of the present invention, FIG. 5 is an exploded perspective view illustrating a base assembly according to an exemplary embodiment of the present invention, FIG. 6 is a cross-sectional view illustrating a camera module according to an exemplary embodiment of the present invention, and FIG. 7 is a perspective view illustrating an conductive substrate of a camera module according to a modification of the present invention.

The camera module may include a lens assembly (100) and a base assembly (200). The lens assembly (100) may be coupled to the base assembly (200). The lens assembly (100) may be coupled to the base assembly (200) through active alignment process. That is, the lens assembly (100) may be coupled to the base assembly (200) by the base assembly (200) by an adhesive member (not shown) that is cured by any one or more of heat and UV rays. The lens assembly (100) may be disposed at an upper side of the base assembly (200).

The lens assembly (100) may include a holder (110), a lens module (120), an optical module (130), an conductive substrate (140), a cover member (150) and a shield member (160). However, any one or more of the holder (110), the lens module (120), the optical module (130), the conductive substrate (140), the cover member (150) and the shield member (160) may be omitted or changed from the lens assembly (100).

The holder (110) may accommodate, at an inside, the lens module (120). The holder (110) may fix the lens module (120) at the inside. An upper side of the holder (110) may be disposed with a body part (141) of the conductive substrate (140). The upper side of the holder (110) may be disposed with the cover member (150). At least a portion of the holder (110) may be accommodated into an inside of the shield member (160). The holder (110) may take a cubic shape having four (4) outer circumferential surfaces. The holder (110) may be formed with an insulation body. However, the present invention is not limited thereto.

The holder (110) may include a reception groove (111) formed by being recessed at an outer side surface. The reception groove (111) may be formed at an outer side surface of the holder (110). The reception groove (111) may be formed at any one of four outer side surface of the holder (110) by being inwardly recessed. The reception groove (111) may accommodate at least a portion of the extension part (146) of the conductive substrate (140).

The holder (110) may include a first lateral surface (112) forming at least a portion of any one of the outer side surface of holder (110). The holder (110) may include a second lateral surface (113) disposed by being inwardly recessed from the first lateral surface (112). The holder (110) may include a first lateral surface (112) disposed by outwardly being protruded from the second lateral surface (113). The extension part (146) of the conductive substrate (140) may be extended along the second lateral surface (113) of the holder (110). A lower end of the holder (110) may be disposed an upper side than a lower end of the terminal part (147, 148). The second lateral surface (113) may be extended to a lower end of the holder (110) from an upper end of the holder (110) in a shape corresponding to that of the extension part (146). The second lateral surface (113) may be extended from a lower end to an upper end of the holder (110) at a predetermined width. The second lateral surface (113) may be formed at a center of a side surface at one side of the holder (110).

The holder (110) may include a positioning end (114) disposed at a lower part by being outwardly protruded from the first lateral surface (112). The positioning end (114) may be outwardly protruded from the first lateral surface (112). The positioning end (114) may be disposed at a lower part of the holder (110). The positioning end (114) may be contacted by a lower end of the shield member (160). An outer side surface of positioning end (114) may be disposed at a more outer side than an outer side surface of the extension part (146). The outer side surface of positioning end (114) may be disposed on a same planar surface as an outer surface of lateral plate of the shield member (160). The second lateral surface (113) of the holder (110) may not be formed with the positioning end (114).

The holder (110) may include a coupling groove (115) coupled to a coupling lug (not shown) of the cover member (150). The coupling groove (150) may be formed at an upper side of the holder (110). The coupling groove (150) may be formed by a portion of an upper surface of the holder (110) being downwardly recessed. The coupling groove (150) may be coupled to the coupling lug of the cover member (150). The coupling groove (150) may take a shape corresponding to that of the coupling lug of the cover member (150). That is, the holder (110) and the cover member (150) may be securely coupled by coupling between the coupling groove (150) of the holder (110) and the coupling lug of the cover member (150). However, as a modification, the holder (110) may be formed with a coupling lug and the cover member (150) may be formed with a coupling groove.

The holder (110) may include a first coupling surface (116) coupled to a base (230). The first coupling surface (116) of holder (110) may be coupled to a second coupling surface (231) of base (230). At this time, an area of the first coupling surface (116) may be smaller than that of the second coupling surface (231). The first coupling surface (116) may move on the second coupling surface (231) as much as a predetermined interval. In other words, the first coupling surface (116) and the second coupling surface (231) may be so formed as to allow the holder (110) and the base (230) to be coupled by an active alignment process. At this time, the first coupling surface (116) and the second coupling surface (231) may be bonded by an adhesive member that may be hardened by any one or more of heat and UV rays for active alignment.

The holder (110) may include an extension lug (117) protruded from a lower surface to a lower side. The extension lug (117) may be downwardly protruded from the lower surface of holder (110). A lower end of the extension lug (117) may be disposed at a lower side than an upper surface of the base (230). That is, at least one portion of the extension lug (117) may be overlapped with the base (230) to a direction perpendicular to an optical axis direction.

The lens module (120) may be disposed at an inside of the holder (110). The lens module (120) may be fixed to an inside of the holder (110). The lens module (120) may be disposed at an upper side with the optical module (130). The lens module (120) may include at least one lens (not shown). The lens module (120) may include a lens and a lens barrel. The lens module (120) may include more than one lens and a lens barrel accommodating more than one lens. However, one element of the lens module (120) is not limited to the lens barrel, and any holder structure supportable one or more lenses may suffice. The lens module (120) may be screw-connected to the holder (110), for example. The lens module (120) may be coupled to the holder (110) by an adhesive, for example. Meantime, a light having passed the lens module (120) may be irradiated on the image sensor (220).

The optical module (130) may be disposed at an upper side of the lens module (120). The optical module (130) may be electrically connected to the conductive substrate (140). The optical module (130) may be electrically connected to an electric current carrying part (143) of the conductive substrate (140). The optical module (130) may be accommodated into a second reception groove (151b) of the cover member (150). The optical module (130) may be provided with a wafer. The optical module (130) may be interposed between a body part (141) of the conductive substrate (140) and the cover member (150).

The optical module (130) may be formed with a cubic shape. The optical module (130) may be formed with at least two electric current carrying pads (not shown). The optical module (130) may be formed with four electric current carrying pads, for example. However, the present invention is not limited thereto. The electric current carrying pad of optical module (130) may be electrically connected by the conductive substrate (140).

The optical module (130) may perform an auto focus function and/or OIS function. That is, the optical module (130) may perform any one or more of the auto focus function and/or the OIS function in response to power being applied. Furthermore, the optical module (130) may be formed with an actuator of single lens moving type. Still furthermore, the optical module (130) may perform an auto focus function and/or OIS function by changing a refractive index of lens. The optical module (130) may include an actuator having a variable lens formed by an LC (Liquid Crystal) lens, piezo polymer lens and the like. In this case, the optical module (130) may perform an auto focus function and/or OIS function by changing the refractive index of light passing through a lens without physically moving the lens. The optical module (130) may include any one or more of a MEMS (Micro Electro Mechanical System) actuator moving by using electrostatic power and piezo force, a MEMS piezo actuator, a MEMS bimorph actuator, a MEMS thermal actuator, a MEMS magnetic actuator, a MEMS liquid actuator, a non-MEMS type actuator, a silicon type actuator, and a liquid lens. However, the present invention is not limited thereto.

The conductive substrate (140) may be electrically connected to the optical module (130). The conductive substrate (140) may be electrically connected to the circuit substrate (210). The conductive substrate (140) may include an FPCB (Flexible Printed Circuit Board). That is, the conductive substrate (140) may have flexibility on at least a portion thereof. In this case, the body part (141) and the extension part (146) are integrally manufactured, where the extension part (146) may be bent to the body part (141).

The conductive substrate (140) may include a body part (141) disposed at an upper side of the holder (110). The body part (141) may be disposed at an upper side of the holder (110). The body part (141) may be electrically conductive with the optical module (130). The body part (141) may be interposed between the holder (110) and the cover member (150). The body part (141) may be formed in a shape corresponding to that of an upper surface of holder (110) and/or a lower surface of cover member (150). An inside of the body part (141) may be formed with a through hole (142).

The conductive substrate (140) may include a through hole (142) passing through an inside of the body part (141) to an optical axis direction. The through hole (142) may pass through an inside of the body part (141) to an optical axis direction. The through hole (142) may be formed in a shape of a polygon including a square and a rectangle, a round and an ellipse. However, the present invention is not limited thereto. A light having passed the optical module (130) through the through hole (142) may be introduced into the lens module (120). The body part (141) may be disposed between an upper surface of holder (110) and a lower surface of cover member (150).

The conductive substrate (140) may include an electric current carrying part (143) protruding inwardly from an inner circumferential surface forming the through hole (142) in the camera module according to the modification as illustrated in FIG. 7. The conductive substrate (140) may include an electric current carrying part (143) electrically connected to the optical module (130). The electric current carrying part (143) may be inwardly protruded from an inner circumferential surface forming the through hole (142). The electric current carrying part (143) may be electrically connected to the optical module (130). The electric current carrying part (143) may be electrically connected to the electric current carrying pad of the optical module (130). For example, the electric current carrying part (143) may include four (4) electric current carrying units coupled to the four (4) electric current carrying pads in a pair. At this time, the electric current carrying part (143) and the electric current carrying pad of optical module (130) may be electrically conducted by an Ag Epoxy.

The conductive substrate (140) may include an extension part (146) bent and extended from one end of the body part (141). The extension part (146) may be bent and extended from one end of the body part (141).

The extension part (146) may be extended along the second lateral surface (113) of the holder (110). The extension part (146) may contact the second lateral surface (113) of the holder (110). The extension part (146) may be directly supported by the second lateral surface (113) of the holder (110). A portion of the extension part (146) may be accommodated into a reception groove (111) of the holder (110). A portion of the extension part (146) may be accommodated into a reception groove (230) of the base (230). A lower end of the extension part (146) may be disposed a lower side than a lower end of the holder (110). A lower end of the extension part (146) may be formed with terminal part (147, 148) electrically conductive to the circuit substrate (210).

The extension part (146) may be extended from an upper end of the holder (110) to a lower end along the second lateral surface (113). The outer circumferential surface of extension part (146) may be disposed at a more inner side than an outer circumferential surface of positioning end (114). The outer circumferential surface of extension part (146) may surface-contact an inner surface of side (lateral) plate of the shield member (160). The thickness of extension part (146) may correspond to a depth of the second lateral surface (113) recessed from the first lateral surface (112). The outer circumferential surface of extension part (146) and the first lateral surface (112) of holder (110) may be disposed on a same planar surface.

The terminal part (147, 148) may be formed at a lower end of the extension part (146). Alternatively, the terminal part (147, 148) may be formed to be spaced apart from a lower end of the extension part (146) at a predetermined distance. The lower end of the terminal part (147, 148) may be disposed at a more lower side than a lower end of the shield member (160). In this case, the lower end of the terminal part (147, 148) may be exposed to an outside. The terminal part (147, 148) may be electrically connected to the circuit substrate (210) through an electric current carrying member (not shown). At this time, the electric current carrying member may include a solder ball formed by the soldering.

The terminal part (147, 148) may include a first terminal (147) and a second terminal (148), each spaced apart from the other. The first terminal (147) and the second terminal (148) may be spaced apart from each other to be disposed at a lower end of the extension part (146). The first terminal (147) and the second terminal (148) may be electrically conducted with the circuit substrate (210). The first terminal (147) and the second terminal (148) may be exposed to an outside, and the externally-exposed first and second terminals (147, 148) may be electrically conducted with the circuit substrate (210) through a soldering process.

The cover member (150) may be disposed at an upper side of the holder (110). The cover member (150) may be accommodated into an inside of the shield member (160). The cover member (150) may be disposed between an upper surface of the holder (110) and a lower surface of the upper plate (161) at the shield member (160). The thickness of cover member (150) to an optical axis direction may be thicker than a thickness of optical module (130) to an optical axis direction.

The cover member (150) may include a first reception groove (151a) formed by being recessed in a shape corresponding, at a portion of the lower surface thereof, to the body part (141) of the conductive substrate (140) and a portion of the extension part (146). The first reception groove (151a) may accommodate the body part (141) of conductive substrate (140) and a portion of the extension part (146). The first reception groove (151a) may form a staircase with a lower surface of cover member (150). The first reception groove (151a) may form a staircase with a second reception groove (151b).

The cover member (150) may include a second reception groove (151b) formed by being recessed in a shape corresponding, at a portion of the lower surface, to the optical module (130). The second reception groove (151b) may accommodate the optical module (130). The cover member (150) may include a second reception groove (151b) accommodated by the optical module (130). The second reception groove (151b) may be formed by allowing a lower surface of the cover member (150) to be upwardly recessed. A width to perpendicular direction with the optical axis direction of the second reception groove (151b) may be greater than a width to a perpendicular direction with the optical axis direction of optical module (130). That is, an outer circumferential surface of optical module (130) may be spaced apart from an inner circumferential surface forming the second reception groove (151b) of cover member (150). The second reception groove (151b) may form a staircase with the first reception groove (151a) by being more recessed than the first reception groove (151a) from a lower surface of the cover member (150).

The cover member (150) may include a marking part (152) marked with directivity of cover member (150) for assembly. The cover member (150) may include a through hole (153) passing through an inside. A light having passed through the through hole (153) may be incident on the optical module (130). The cover member (150) may include a coupling lug coupled to the coupling groove (115) of the holder (110). The coupling lug may be downwardly protruded from a lower surface of cover member (150).

The shield member (160) may accommodate, at an inside thereof, the cover member (150). The shield member (160) may accommodate, at an inside, at least a portion of holder (110). The lower end of shield member (160) may contact the positioning end (114) of holder (110).

The shield member (160) may be formed with a metal material. The shield member (160) may be formed with a metal plate. In this case, the shield member (160) may shield an EMI (Electro Magnetic Interference). Due to this feature of shield member (160), the shield member (160) may be called an EMI shield can. The shield member (160) may cut off radio wave generated from outside of the shield member (160) from entering into an inside of the shield member (160). Furthermore, the shield member (160) may cut off the radio wave generated from inside of the shield member (160) from being emitted to an outside of the shield member (160). However, the material of shield member (160) is not limited thereto.

The shield member (160) may include an upper plate (161) and a lateral (side) plate (162). The shield member (160) may include an upper plate (161) and a lateral plate (162) bent downwardly from the upper plate (161). A lower end of lateral plate (162) at the shield member (160) may be mounted on the positioning end (114) of holder (110). An inner lateral surface of shield member (160) may be mounted on the holder (110) by being tightly contacted to a portion or all of holder (110). An inner space formed by the shield member (160) and the holder (110) may be disposed with the holder (110), the lens module (120), the optical module (130), the conductive substrate (140) and the cover member (150). Through this structure, the shield member (160) can protect inner constitutional elements from outside impact. Furthermore, the shield member (160) may inhibit foreign pollutant materials from entering into an inside. However, the shield member (160) may be directly coupled to the base (230) disposed at a lower side of holder (110) or the circuit substrate (210).

The shield member (160) may include a through hole (163) passing through an inside of the upper plate (161) to an optical axis direction. The shield member (160) may include a through hole (163) formed at the upper plate (161) to expose the lens module. The through hole (163) may be formed in a shape corresponding to that of the lens module (120). The size of through hole (163) may be formed to be greater than a diameter of lens module (120) to allow the lens module (120) to be assembled through the through hole (163). Meantime, the light having passed through the through hole (163) may be introduced into the lens module (120). At this time, the light having passed the lens module (120) may be obtained as an image by the image sensor (220).

The base assembly (200) may be coupled with the lens assembly (100). The base assembly (200) may be coupled with the lens assembly (100) through active alignment process. The base assembly (200) may be disposed at a lower (lower) side of the lens assembly (100).

The base assembly (200) may include a circuit substrate (210), an image sensor (220), a base (230), a filter (240) and a connector (250). However, any one or more of the circuit substrate (210), the image sensor (220), the base (230), the filter (240) and the connector (250) may be omitted or changed from the base assembly (200).

The circuit substrate (210) may support the lens assembly (100). The circuit substrate (210) may be mounted with the image sensor (220). An upper surface of circuit substrate (210) may be disposed with the base (230). An inner side of the upper surface at the circuit substrate (210) may be disposed with the image sensor (220), and an outside of the upper surface at the circuit substrate (210) may be disposed with the base (230). An upper side of base (230) may be disposed with the lens assembly (100). Alternatively, an outside of upper surface at the circuit substrate (210) may be disposed with the lens assembly (100), and an inside of the upper surface at the circuit substrate (210) may be disposed with the image sensor (220). That is, the base (230) may be omitted and instead the holder (110) may be directly coupled with the circuit substrate (210).

The circuit substrate (210) may supply an electric power to the lens assembly (100). The circuit substrate (210) may be electrically connected to terminal part (147, 148) of the conductive substrate (140) through the electric current carrying member. That is, the circuit substrate (210) and the conductive substrate (140) may be electrically conducted. In this case, the circuit substrate (210) can supply the electric power to the optical module (130) through the conductive substrate (140). The circuit substrate (210) may be disposed with a controller for controlling the lens assembly (100).

The image sensor (220) may be mounted on the circuit substrate (210). The image sensor (220) may be accommodated into an inside of the base (230). The image sensor (220) may be so disposed as to match with the lens module (120) in terms of optical axis, through which the image sensor (220) can obtain the light having passed the lens module (120). The image sensor (220) may output the obtained light as an image. The image sensor (220) may include any one or more of a CCD (charge coupled device), a MOS (metal oxide semi-conductor), a CPD and a CID. However, the present invention is not limited thereto.

The base (230) may be disposed at an upper surface of circuit substrate (210). The base (230) may accommodate, at an inside thereof, the image sensor (220). The base (230) may support the holder (110). The base (230) may be coupled with the holder (110). The base (230) may be coupled with a first coupling surface (116) of holder (110). The base (230) may be coupled by the filter (240).

The base (230) may include a second coupling surface (231) coupled with the first coupling surface (116) of holder (110). An area of second coupling surface (231) may be different from that of the first coupling surface (116). The area of second coupling surface (231) may be greater than that of the first coupling surface (116). The second coupling surface (231) may be overlapped with the first coupling surface (116) to an optical axis direction.

The base (230) may include a reception groove (232) formed by being inwardly recessed from an outer circumferential surface. The reception groove (232) may be formed by being inwardly recessed from an outer circumferential surface of base (230). The reception groove (232) may accommodate a portion of the extension part (146) of the conductive substrate (140). the reception groove (232) may accommodate at least a portion of the extension lug (117) of holder (110). The reception groove (232) may be extended from a lower surface of holder (110), and one surface of reception groove (232) may accommodate at least a portion of the extension lug (117) formed to the second lateral surface (113).

The base (230) may include a through hole (233) passing through an inside to an optical axis direction. The through hole (233) may be disposed with the filter (240). The light having passed the through hole (233) may be introduced into the image sensor (220).

The base (230) may include a lug part (234) protruding from an upper surface to an upper side and coupled, at an inside, by the filter (240). The lug part (234) may be protruded from an upper surface of base (230) to an upper side. An inside of the lug part (234) may be coupled by the filter (240). The lug part (234) may be spaced apart from an inner circumferential surface of holder (110). In this case, an allowance space can be obtained for active alignment of holder (110).

The filter (240) may be disposed at the through hole (233) of base (230). Alternatively, the filter (220) may be disposed at a holder member (not shown) which is separately formed apart from the base (230). The filter (240) may cut off a light of infrared region from being incident on the image sensor (220). The filter (240) may include an infrared absorption filter (Blue filter). The filter (240) may include an infrared reflection filter (IR cut filter). The filter (240) may be interposed between the lens module (120) and the image sensor (220). The filter (240) may be formed with a film material or a glass material. The filter (240) may be formed by coating an infrared cut-off coating material on a plate-type optical filter such as an imaging surface protection cover glass or a cover glass. However, the present invention is not limited thereto.

The connector (250) may be electrically connected to the circuit substrate (210). The connector (250) may be electrically connected to an external element of camera module. That is, the connector (250) may be used to electrically connect the external element of camera module to the camera module.

The camera module according to an exemplary embodiment of the present invention may further comprise a controller (not shown). The controller may be mounted on the circuit substrate (210). The controller may be disposed at an outside of the lens assembly (100). However, the controller may be also disposed at an inside of the lens assembly (100). The controller may control the direction of current supplied to the optical module (130) at the lens assembly (100), intensity and amplitude. The controller may control the optical module (130) to perform any one or more of the auto focus function and OIS function of the camera module.

Hereinafter, an assembly process of camera module according to an exemplary embodiment of the present invention will be described.

First, the assembly process of lens assembly (100) will be explained.

A first coupling body coupled with the lens module (120) on the holder (110) is prepared. The optical module (130) and the conductive substrate (140) are electrically connected through an Ag Epoxy. At this time, the coupling by the Ag epoxy may be replaced by any conductive coupling method including a coupling by a soldering. Then, the optical module (130) is covered with the cover member (150), which is an initial mold product, in order to protect from an external pressure. In other words, the cover member (150) may be manufactured through molding process. The cover member (150) thus manufactured may be so coupled as to accommodate the optical module (130). Thereafter, a second coupling body is prepared by covering the cover member (150) with the shield member (160). The prepared second coupling body is coupled to the first coupling body to complete the assembly of optical lens assembly (100). At this time, the extension part (146) of conductive substrate (140) is made to contact the second lateral surface (113) of holder (110). However, the assembly of lens assembly (100) may be also finished in such a manner that the cover member (150) coupled with the optical module (130) is coupled to the first coupling body, on which the shield member (160) is then covered.

Now, the assembly process of base assembly (200) will be explained.

The circuit substrate (210) coupled with the connector (250) is prepared. Then, the image sensor (220) is mounted on an upper surface of circuit substrate (210). Thereafter, the base (230) coupled with the filter (240) is fixed on an upper surface of circuit substrate (210) in order to accommodate the image sensor (220) at an inside to thereby complete the assembly of base assembly (200).

Thereafter, the lens assembly (100) is mounted on the base assembly (200) through the active alignment process. To be more specific, an epoxy curable by heat or ultraviolet rays is coated on the second coupling surface (231) of the base (230). The first coupling surface (116) of holder (110) is arranged on the epoxy. Subsequently, an alignment between an optical axis of lens module (120) and an optical axis of image sensor (220) is adjusted. When an alignment of optical axis between the lens module (120) and the image sensor (220) is adjusted, epoxy is hardened using ultraviolet rays. Thereafter, the epoxy is hardened in earnest in the oven to fix the lens assembly (100) to the base assembly (200). Meantime, the pair of terminals (147, 148) of the conductive substrate (140) and the circuit substrate (210) are electrically connected using the soldering process to complete the manufacturing of camera module according to an exemplary embodiment of present invention.

Although the present disclosure has been explained with all constituent elements forming the exemplary embodiments of the present disclosure being combined in one embodiment, or being operated in one embodiment, the present disclosure is not limited thereto. That is, in some cases, the described features, structures, or operations may be combined in any suitable manner in one or more embodiments. It will also be readily understood that the components of the embodiments, as generally described and illustrated in the figures herein, could be arranged and designed in a wide variety of different configurations.

In the term "includes", "including", "comprises" and/or "comprising" as used herein, the mentioned component, step, operation and/or device is not excluded from presence or addition of one or more other components, steps, operations and/or devices.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

Although the abovementioned embodiments according to the present invention have been described in detail with reference to the above specific examples, the embodiments are, however, intended to be illustrative only, and thereby do not limit the scope of protection of the present invention. Thereby, it should be appreciated by the skilled in the art that changes, modifications and amendments to the above examples may be made without deviating from the scope of protection of the invention.

The invention claimed is:

1. A camera module comprising:
a PCB (Printed Circuit Board);
an image sensor disposed on the PCB;
a holder disposed on the PCB;
a lens coupled with the holder;
an actuator disposed on the lens;
a substrate electrically connecting the actuator and the PCB;
a shield member covering at least a portion of the holder; and
a base disposed between the PCB and the holder,
wherein the holder comprises a positioning end outwardly protruding from a lateral surface of the holder,
wherein the shield member is disposed on the positioning end,
wherein the base comprises a receptor groove concavely formed on a lateral surface of the base,
wherein the substrate comprises a first terminal disposed on the receptor groove of the base and coupled with the PCB, and
wherein the receptor groove of the base accommodates an extension lug extending from a lower surface of the holder.

2. The camera module of claim 1, comprising an optical module configured to perform at least one of an auto focus function and an optical image stabilization function, and
wherein the optical module comprises the actuator.

3. The camera module of claim 1, comprising a cover member disposed on the holder,
wherein the substrate comprises a body part disposed between the holder and the cover member,
wherein the actuator is disposed between the body part of the substrate and the cover member,
wherein the cover member comprises a first groove comprising a shape corresponding to a body part of the substrate and disposed with the body part of the substrate and a second groove comprising a shape corresponding to the actuator and disposed with the actuator, and
wherein the second groove forms a staircase with the first groove by being more recessed than the first groove.

4. The camera module of claim 3, wherein the holder comprises a groove formed on the lateral surface of the holder,
wherein the substrate comprises an extension part disposed on the groove of the holder, and
wherein the groove of the holder comprises a shape corresponding to the extension part.

5. The camera module of claim 4, wherein the extension part is integrally formed with the body part.

6. The camera module of claim 4, wherein the shield member comprises an upper plate and a lateral plate extending from the upper plate, and
wherein the extension part contacts the lateral plate of the shield member.

7. The camera module of claim 3, wherein the holder comprises a hole,
wherein the lens is disposed on the hole of the holder,
wherein the body part of the substrate is disposed on a perimeter of the hole of the holder, and
wherein the body part of the substrate comprises a hole disposed between the lens and the actuator.

8. The camera module of claim 1, comprising a filter disposed on the base.

9. The camera module of claim 1, wherein the substrate comprises a hole and a second terminal protruding inwardly from an inner peripheral surface of the hole of the substrate, and wherein the second terminal is coupled with the actuator.

10. The camera module of claim 1, wherein a lower end of the first terminal is disposed lower than a lower end of the holder.

11. The camera module of claim 1, wherein the first terminal is disposed lower than a lower end of the shield member to be exposed to an outside.

12. The camera module of claim 1, wherein the actuator comprises a liquid lens.

13. An optical device, comprising:
a body;
the camera module of claim 1 disposed on the body to photograph an image of a subject; and
a display disposed on the body to output the image photographed by the camera module.

14. The camera module of claim 1, wherein at least a portion of the extension lug of the holder is overlapped with the base in a direction perpendicular to an optical axis direction.

15. The camera module of claim 1, wherein the cover member comprises a marking part marked with directivity of the cover member.

16. A camera module comprising:
a PCB (Printed Circuit Board);
an image sensor disposed on the PCB;
a base disposed on the PCB;
a holder disposed on the base;
a lens coupled with the holder;
an actuator coupled with the lens;
a substrate electrically connected with the actuator; and
a shield member disposed on the holder; and
a cover member disposed on the holder,
wherein the holder comprises a positioning end outwardly protruding from a lateral surface of the holder,
wherein the shield member is disposed on the positioning end,
wherein the substrate comprises a body part disposed between the holder and the cover member,
wherein the actuator is disposed between the body part of the substrate and the cover member,
wherein the cover member comprises a first groove comprising a shape corresponding to a body part of the substrate and disposed with the body part of the substrate and a second groove comprising a shape corresponding to the actuator and disposed with the actuator, and
wherein the second groove forms a staircase with the first groove by being more recessed than the first groove.

17. The camera module of claim 16, comprising an optical module configured to perform at least one of an auto focus function and an optical image stabilization function, and
wherein the optical module comprises the actuator.

18. The camera module of claim 16, wherein the base comprises a receptor groove concavely formed on a lateral surface of the base, and
wherein the substrate comprises a first terminal disposed on the receptor groove of the base and coupled with the PCB.

19. The camera module of claim 18, wherein the substrate comprises a hole and a second terminal protruding inwardly from an inner peripheral surface of the hole of the substrate, and
wherein the second terminal is coupled with the actuator.

20. The camera module of claim 16, comprising a filter disposed on the base.

* * * * *